Patented Apr. 30, 1940

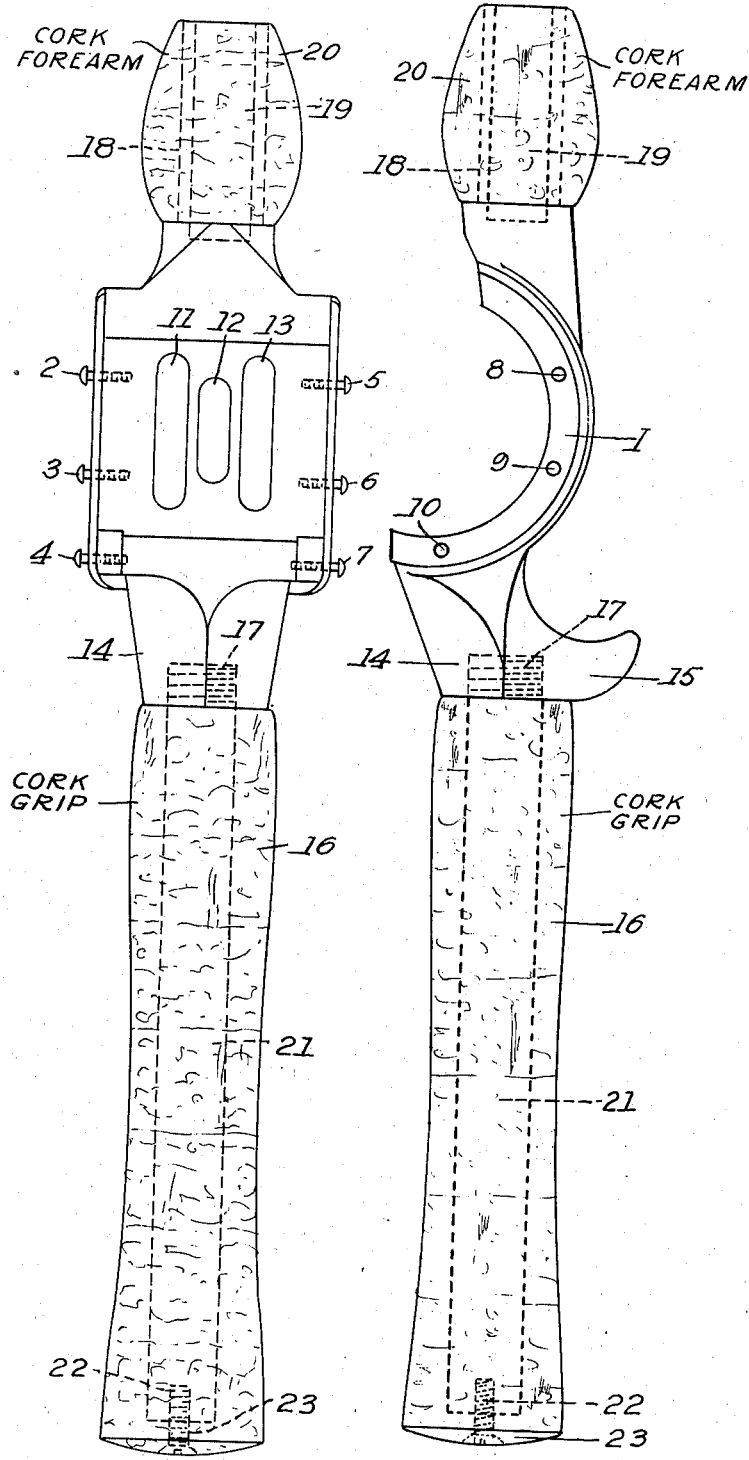

2,198,856

UNITED STATES PATENT OFFICE 2,198,856

REEL HANDLE

Harvey Bowman, San Antonio, Tex.

Application February 14, 1939, Serial No. 256,292

6 Claims. (Cl. 43—20)

The invention relates to an improvement in the manner of attaching the reel to the handle of a casting rod, so that the handle and reel will form one compact unit, thus doing away with all locking devices, such as lugs, spring locks, wedges, etc.

The reel handle consists of three parts: a cradle, a grip and a forearm, the cradle having a rearward extension to which the grip is attached, and a forward extension to which the forearm is attached. In this ensemble the reel, instead of being placed on top of the handle as an accessory or adjunct, is incorporated in and made a part of it by substituting, in place of the ordinary handle, a handle containing a cradle into which the reel is introduced in such a way that it becomes, both in appearance and in fact, an integral part of the handle.

In the accompanying drawing Figure 1 shows a side view of the reel handle, and Figure 2 shows a view of the upper side.

The cradle 1 consists of one piece of steel, the central portion being semi-circular in shape to receive the reel, which is fastened to the cradle by six screws 2, 3, 4, 5, 6, 7, which fit into the screw holes 8, 9, 10, three on each side, opposite the screw holes in the head and heel plates of the reel. The openings 11, 12, 13, in the cradle, permit the water from the reel to escape.

The rearward extension 14 of the cradle has, on its under side, a finger-grip 15, shaped like a trigger, which enables the hand to get a firmer hold on the grip 16, giving better control of the rod and thereby increasing both the accuracy and the distance of the throw. In this extension of the cradle there is a threaded hole 17 into which the cork grip is screwed.

The forward extension 18 of the cradle is cylindrical and hollow 19, so as to receive the end of the rod, and is encased in the cork forearm 20.

The cork grip 16 has extending through it a steel rod 21 which is threaded at its forward end where it screws into the threaded hole 17 in the cradle extension 14. At its rearward end this steel rod is threaded 22 to receive the screw which holds in place the circular slightly oval plate 23 which prevents the cork grip from slipping off its steel rod center.

I claim:

1. A reel seat for a reel of the type having side plates, said seat comprising a forward portion to be associated with a rod, a rear portion to be associated with a handle, and a substantially semi-circular intermediate portion connecting said forward and rear portions and providing an upwardly opening recess for receiving a reel only by downward movement thereof into the recess, and securing elements adapted to extend through openings in the reel side plates and into the intermediate portion to secure the reel thereto.

2. A reel seat for a reel of the type having side plates, said seat comprising a forward portion to be associated with a rod, a rear portion to be associated with a handle, and a substantially semi-circular intermediate portion connecting said forward and rear portions and providing an upwardly opening recess for receiving a reel only by downward movement thereof into the recess, and means on said intermediate portion adapted to be positioned between and in contact with the opposite inner faces of the reel side plates for preventing lateral movement of the reel with respect to said intermediate portion.

3. A reel seat for a reel of the type having side plates, said seat comprising a forward portion to be associated with a rod, a rear portion to be associated with a handle, and a substantially semi-circular intermediate portion connecting said forward and rear portions and extending downwardly below the longitudinal axis of the forward and rear portions and providing an upwardly opening recess for receiving a reel only by downward movement thereof into the recess, said intermediate portion being formed inwardly of its opposite side edges with shoulders adapted to engage the opposite inner faces of the side plates of the reel to prevent lateral movement of the reel with respect to the intermediate portion, and means for directly and fixedly attaching the side plates of the reel to said intermediate portion to maintain the reel in fixed relation thereto.

4. A reel seat for a one-piece reel of the type having side plates, said seat comprising a forward portion to be associated with a rod, a rear portion to be associated with a handle and a substantially semi-circular intermediate portion connecting said forward and rear portions and providing an upwardly opening recess for receiving a reel only by downward movement thereof into the recess, said intermediate portion being formed inwardly of its opposite side edges with integral arcuate shoulders for contact with the opposite inner faces of the side plates of the reel, and detachable fastening elements adapted to extend through openings in the side plates of the reel and into said shoulders for fixedly securing the reel to the intermediate portion.

5. A fishing rod handle comprising a grip portion, a rod holding portion and a substantially semi-circular cradle portion between and connecting said grid and rod holding portions and providing an upwardly opening recess for receiving a reel only by downward movement thereof into the recess, said cradle portion being provided inwardly of its opposite side edges with locating means adapted to be disposed between and abut the opposite inner faces of side plates of a reel, said locating means facilitating aligning the reel in operative relation to and preventing lateral movement thereof with respect to said cradle portion, and means for directly and fixedly attaching the reel side plates to said cradle portion to maintain the reel in fixed relation thereto.

6. In a fishing rod handle consisting of a hand-grip portion, a rod holding portion and an intermediate reel supporting member, a supporting portion in said member consisting of a substantially semi-circular intermediate part providing an upwardly opening recess for receiving a reel only by downward movement thereof into the recess, a rearward integral extension constituting a finger hold and a front reduced part constituting a support and connection for the rod, said substantially semi-circular intermediate part having laterally extending flanges and inwardly positioned shoulders, said shoulders constituting means integral with the intermediate member for maintaining a reel in alignment with the hand-grip, the finger hold and rod connection.

HARVEY BOWMAN.